United States Patent

[11] 3,593,899

| | | |
|---|---|---|
| [72] | Inventor | Robert P. DeTorre<br>Pittsburgh, Pa. |
| [21] | Appl. No | 863,269 |
| [22] | Filed | Oct. 2, 1969 |
| [23] | | Division of Ser. No. 732,564, May 28, 1968, Abandoned |
| [45] | Patented | July 20, 1971 |
| [73] | Assignee | PPG Industries, Inc.<br>Pittsburgh, Pa. |

[54] GLASS-SCORING PROCESS
2 Claims, 2 Drawing Figs.

[52] U.S. Cl.................................................... 225/2,
83/12, 83/676, 225/96.5
[51] Int. Cl....................................................... B26f 3/00

[50] Field of Search ............................. 83/5, 7, 12,
675, 676, 678, 469; 225/2, 96, 96.5

[56] References Cited
UNITED STATES PATENTS
| | | | |
|---|---|---|---|
| 1,123,532 | 1/1915 | Heynau........................ | 83/676 X |
| 2,181,314 | 11/1939 | Burns............................ | 83/12 X |

Primary Examiner—Frank T. Yost
Attorney—Chisholm and Spencer

ABSTRACT: An improved wheel for scoring glass having dual scoring edges spaced in close proximity and a pair of sloping faces intersecting at an angle of 120°.

A process of producing a score in a glass sheet by directing the fissure pressure from a multipoint pressure source and focusing the pressure so as to reinforce the pressure action in a preselected direction.

PATENTED JUL 20 1971 3,593,899

INVENTOR
ROBERT P. DeTORRE

Chisholm and Spencer
ATTORNEYS

GLASS-SCORING PROCESS

This application is a division of Ser. No. 732,564, filed May 28, 1968, now abandoned.

Glass to be severed is now scored with a metal scoring device and the glass is separated along the score line by the application of bending moments about the score line. The relationship between the score line and bending moment is determinative of the quality of the score line. The scoring tool is worn down with each application to the glass. The resulting score or fissure has a depth of between 5 or 10 to as much as 40 thousandths of an inch while the width of the fissure across the top is about one 10-thousandth of an inch. The depth of the score depends upon the pressure applied to the score tool, the cutting edge angle, and, of course, the kind of glass substrate being scored.

In addition to the fissure the scoring tool produces a network of fractures or wings extending away from the score line just under the glass surface. These wings also produce chips of glass known as "flakes" that are caused when a scoring device is used with either high pressure or lubricating oil.

For each type of glass and each wheel angle there is a particular range of pressure which produces the best cuts. This invention is an improved scoring wheel having two scoring edges and an improved method of producing a fracture in a glass beneath the scoring wheel.

A complete understanding of this invention may be had by referring to the drawing wherein.

The prior art scoring wheel, usually steel or other metal having desirable hardness characteristics, is sharpened to produce a periphery having sharp intersecting faces to form a single point for application to the glass. The improved scoring wheel of this invention has two scoring edges in proximity.

Figure 1:
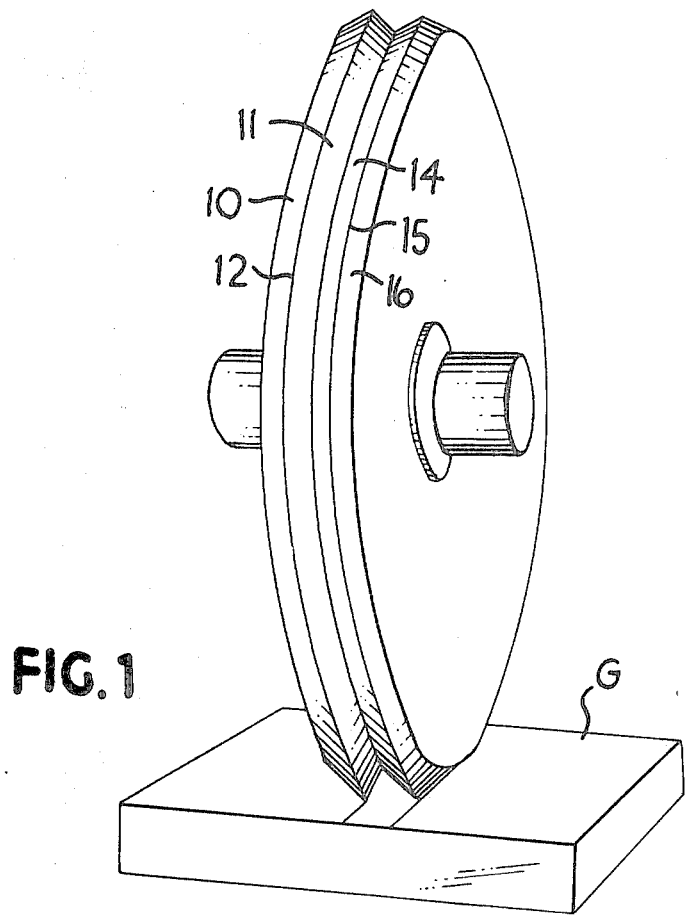
FIG. 1 is an edge view of the improved scoring device.
Figure 2:
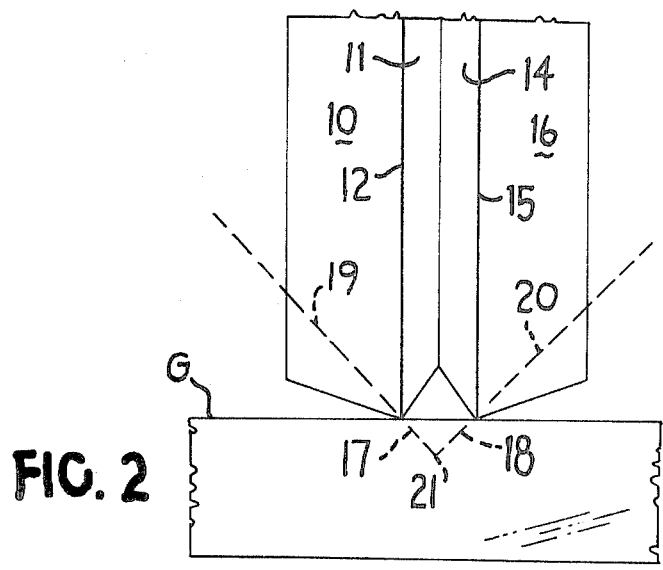
FIG. 2 is an enlarged view of the scoring device and associate glass substrate.

The scoring wheel is mounted on a suitable shaft or axil for rotation, as is known in the prior art. The improved scoring wheel has lateral faces 10 and 16 and inner faces 11 and 14. One lateral face 10 intersects with inner face 11 to produce a scoring edge 12. A second lateral face 16 intersects with its associated inner face 14 to form a second scoring edge 15. It may be seen from FIG. 2 that the associated angles of the intersecting faces are as follows: lateral face 10 intersects inner face 11 forming the cutting line 12 at an angle of approximately 120°. The bisectors of the angles of the lateral faces, lines 19 and 20, intersect a common line at a point 21 in the glass at an angle of 80°. It has been determined that the offset angles bias their respective fissures or scores 17 and 18 toward each other. The biased fissures meet during the scoring operation or whenever an opening moment is applied to the glass, depending on the scoring force.

A bisecting line 17 on a typical lateral face 10 drawn through the intersecting edges of lateral 10 and inner face 14 and extending into the glass, as shown at 17 (and 18), shows the direction of the pressure and resultant fracture in the glass. This dual edge scoring wheel produces a control over the direction of the lines of force, 17 and 18, so that they are directed or shaped towards a common point of intersection 21 beneath the surface of the glass. The intersection of the forces is a function of the scoring pressure applied. The fissures produced from each scoring edge are always directed towards a common meeting point, whether they intersect or not during the operation is a function of pressure applied to the scoring wheel against the glass surface. At some pressures the fissures produced from each scoring edge do not meet until an opening force is applied to the glass, then the directed or biased fractures propagate to form a resultant fracture. When the pressures are higher the fracture is propagated without additional bending force. It has been found that the stress available for fracturing the glass is double the normal stress available when using a single scoring surface wheel. It has been determined that the minimal distance between the scoring edges of the wheel produces best results at about 0.010 inch when the distance between the outer lateral faces of the scoring wheel is about 0.080 inch. Experimentation has shown that the angle of intersection of the projected forces from the scoring edge produces the best result when the particular wheel is designed for scoring a particular thickness of the glass sheet. The usual glass sheet is approximately ⅜ inch thick. The improved scoring wheel of this invention results in a glass fracture which is free from obnoxious defects which are commonly the result of applying increased pressure to the prior art single scoring edge wheel. The use of lower cutting pressures on each scoring edge results in a more desirable fracture line, especially for thicker glasses, yet prolongs the useful life of the scoring wheel because of the greatly reduced pressure or force per cutting area on the contacting edges of the scoring wheel.

What I claim is:

1. A method of scoring and fracturing a glass sheet comprising:
   a. applying pressure to the glass surface at points spaced apart on the surface of the glass;
   b. directing a component of force from each of said pressure points into the surface of the glass at an angle from the perpendicular to the glass, so that the force lines intersect within a glass surface;
   c. weakening a portion of the glass surface between the pressure points;
   d. moving said pressure points along said glass surface in parallel lines to form a fracture line and then severing said glass along said fracture line.

2. A method of fracturing a glass sheet along a line comprising:
   a. applying pressure to the glass surface at two spaced apart points so that the lines of force intersect within the surface;
   b. moving said points of pressure application along a path of travel, thus forming a line of fracture in the glass along said path.